Figure 5:
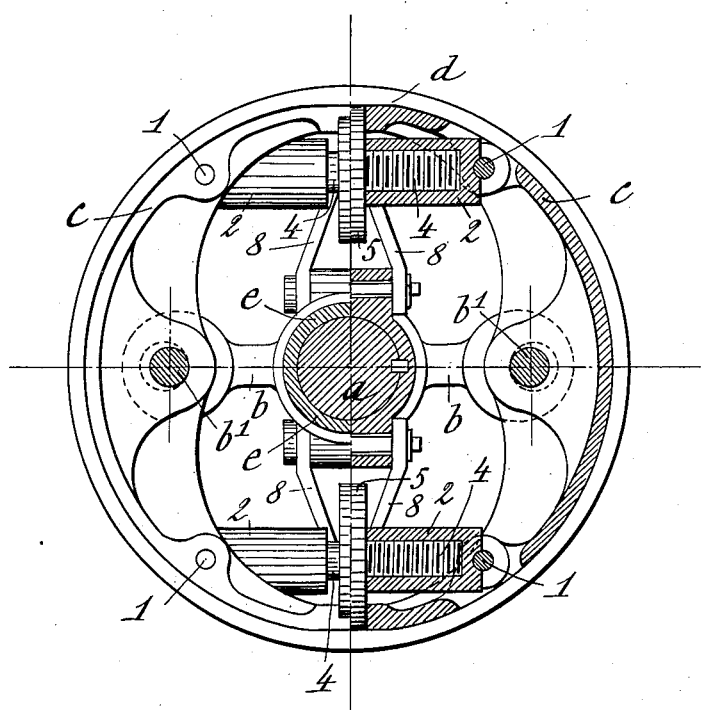

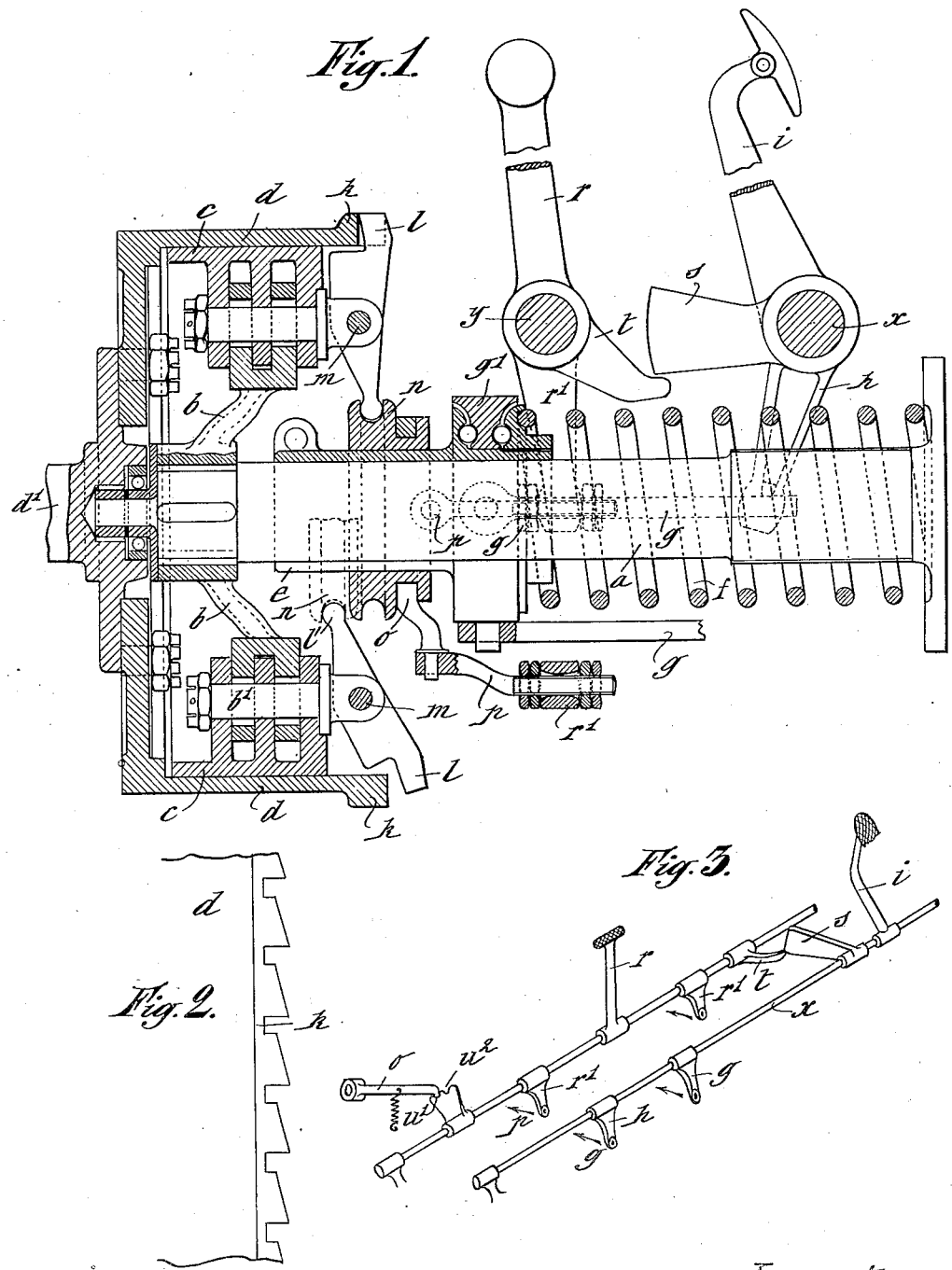

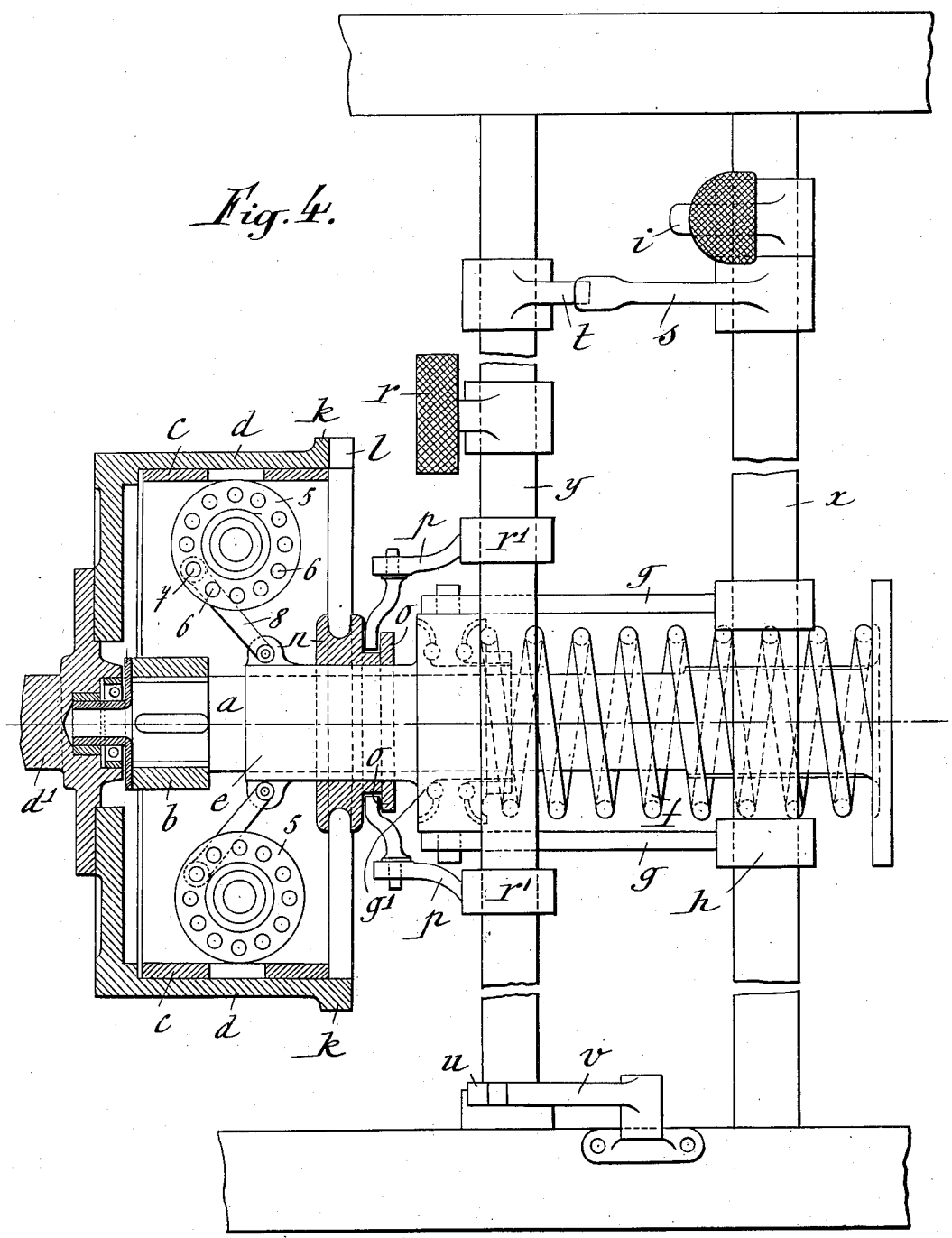

No. 880,083. PATENTED FEB. 25, 1908.
E. LEHMANN.
FRICTION CLUTCH.
APPLICATION FILED NOV. 27, 1906.

3 SHEETS—SHEET 3.

Witnesses:
Waldo M. Chapin
James D'Antonio

Inventor
ERNEST LEHMANN,
By Attys
Rosenbaum & Stockbridge

UNITED STATES PATENT OFFICE.

ERNST LEHMANN, OF MARCHIENNE-AU-PONT, BELGIUM.

FRICTION-CLUTCH.

No. 880,088.　　　　Specification of Letters Patent.　　　　Patented Feb. 25, 1908.

Application filed November 27, 1906. Serial No. 345,370.

*To all whom it may concern:*

Be it known that I, ERNST LEHMANN, a subject of Germany, residing at Marchienne-au-Pont, in the Kingdom of Belgium, have invented new and useful Improvements in Friction-Clutches, of which the following is a specification.

My invention relates to friction clutches having a gradual action and has for its object to avoid in this class of apparatus the usual slipping of the friction surfaces which takes place when the clutch is subjected to shocks and vibrations as it is the case for instance when used on a motor-vehicle or the like.

A further object of my invention is to provide a clutch the dimensions of which can be extremely reduced.

With these objects in view, my invention essentially consists in the special arrangement and combinations of parts as hereinafter fully described and pointed out in the appended claims.

In the annexed drawings: Figure 1 shows in its upper part a vertical section through a friction clutch constructed according to the invention, the friction surfaces of the clutch being "blocked" so as to avoid any slipping when in action and in the lower part a horizontal section through the same clutch, the surfaces being "unblocked" before the starting or stopping of the clutch; Fig. 2 is a plan view of a developed part of the driving member of the clutch; Fig. 3 is a separate and diagrammatic view of the pedal shafts actuating the clutch. Fig. 4 is a horizontal section through the clutch showing the means by which the frictional part of the clutch is actuated. Fig. 5 shows at the right part of the figure a front view of the clutch and at the left part a section through the axis of the means actuating the frictional part of the clutch.

The clutch properly so called may be of any suitable construction and makes no part of the invention which consists more particularly in the provision of suitable blocking means adapted to bodily connect the driving member of the clutch with the driven member as soon as the starting is effected.

In the drawing $a$ indicates a driven shaft on which is keyed a cross-piece $b$ provided with arms connected by bolts $b^1$ with two friction members $c$. The said members which may be formed of a suitable metal band are adapted to be expanded and contracted radially in a cylindrical casing $d$ which may form a part of a fly-wheel keyed on a driving shaft $d^1$. To this end each friction member $c$ is provided with two trunnions 1 (Fig. 5) to which are pivoted sleeves 2 provided inside with a right-hand screw-thread for one friction member $c$ and with a left hand screw-thread for the second friction member $c$. In the said sleeves 2 act corresponding screws 4 forming at the middle of their length circular plates 5 having equi-distance holes 6 (Fig. 4) in which are engaged pins 7 projecting from four connecting rods 8 pivoted on a sleeve $e$ sliding on the shaft $a$. The parts thus far described are arranged combined and operated as in any ordinary well-known construction of friction clutch.

According to the invention in order to prevent any slipping of the friction members $c$ on the inner face of the casing $d$ when the clutch is in operation, the said members are adapted to be bodily connected or blocked with the casing $d$ by means of bolts or catches $l$ rocking on trunnions $m$ provided on the bolts $b^1$ connecting the cross-piece $b$ with the friction members $c$. When the said bolts or catches $l$ are brought nearly in a vertical position they are put in engagement with teeth $k$ provided on the outer edge of the casing $d$ (Fig. 2). Further when they are rocked in an opposite direction on the trunnions $m$ the said bolts $l$ are released or disengaged from the said teeth $k$.

The rocking of the bolts $l$ is produced by aid of a second sleeve $n$ sliding on the sleeve $e$ already mentioned. The actuating movement of the sleeves $e$ and $n$ is caused by two pedal shafts $x\ y$ (Figs. 1 and 3). The shaft $x$ is provided with the usual clutching pedal $i$ which by aid of two arms $h$ and two rods $g$ acts on the sleeve $e$ by aid of the ordinary arrangement of thrust bearing collar $q^1$ so as to cause the disengagement of the friction members, the clutching engagement of the friction members being permanently secured by aid of a coiled spring $f$ acting directly on the sleeve $e$ when the pedal $i$ is not acted upon. The second shaft $y$ is similarly provided with a pedal $r$ actuating by two arms $r^1$, two rods $p$ and a thrust bearing $o$, the sleeve $n$ in which the ends $l^1$ of the bolts $l$ are held in suitable cavities or pockets.

As it will be obvious the sleeve $n$ when sliding to the right in Fig. 1 causes the bolts $l$ to be brought in the "blocking position" in which they are in engagement with the teeth $k$ of the casing $d$ and when sliding to the left as shown in dotted lines in the lower part of Fig. 1 causes the bolts $l$ to be rocked on their trunnions $m$ so as to be disengaged from the said teeth. The shaft $x$ is further provided with an arm $s$ adapted to act, at the moment of stopping the action of the clutch on an arm $t$ keyed on shaft $y$ in such a manner as to cause an angular rotation of the said shaft which will be sufficient to disengage the bolts $l$ from the teeth $k$, the two arms $s$ and $t$ coöperate also to prevent any blocking of the friction members by the bolts $l$ so long as the pedal $i$ is in the unclutching position. In order to avoid that the bolts or catches $l$ remain in an undue position between the blocking and unblocking positions or that they should be unduly disengaged from the teeth $k$ under the action of a shock, the shaft $y$ is provided with a segment $u$ carrying two notches $u^1$ and $u^2$ (Fig. 3) into one of which is engaged the end of a spring actuated pawl $o$.

The device thus described acts as follows: Under the action of the spring $f$, the sleeve $e$ is displaced to the left in Fig. 1 and the friction members $c$ are brought in the usual manner in frictional engagement with the inner face of the casing $d$ which consequently transmits power to the members $c$ and to the shaft $a$ which is rotated by the cross-piece $b$ connected to the members $c$. As soon as the rotative inertia of the driven part is overcome, the friction members $c$ are rotated with nearly the same speed as the driving member $d$ and it is then possible to "block" the clutch by acting on the pedal $r$ and rocking the same to the left. The pedal $r$ displacing the sleeve $n$ to the right causes the bolts or catches $l$ to come in engagement with the teeth of the driving member $d$. (Fig. 1—upper part). In order to disengage the parts, it is only necessary to act on the pedal $i$ so as to rock the same to the left; then the arm $s$ acts on the arm $t$ to rotate the shaft $y$, so as to move the sleeve $n$ to the left which results in the "unblocking" of the bolts $l$ (Fig. 1—lower part). On account of a certain amount of free movement of the rods $g$, the stopping action of the clutch, that is to say the disengagement of the members $c$ and $d$ is effected only after the unblocking of the bolts or catches $l$ in order to prevent the disengagement of the said bolts from the teeth $k$ when under full charge.

As it will be obvious owing to the hereinbefore described arrangement, any slipping of the friction members of the clutch during action will be prevented in a very simple and efficient manner.

Having thus described my invention what I claim is:

1. In a friction clutch in combination a casing, the said casing serving as a driving member and being provided with teeth on its outer edge, friction members coöperating with the inner face of the said casing, a driven shaft, a sleeve adapted to slide on said shaft and acting on the friction members to bring them in frictional engagement with the driving member, bolts or catches pivoted on the said friction members and adapted to be engaged with the teeth on the driving member, a second sleeve actuating the said bolts or catches, and means whereby the said second sleeve is acted upon on the stopping of the clutch substantially as described and for the purpose set forth.

2. In a friction clutch in combination a casing serving as a driving member and being provided with teeth on its outer edge, friction members coöperating with the inner face of the said casing, a driven shaft, a sleeve adapted to slide on said shaft and acting on the friction members to bring them in frictional engagement with the driving member, bolts or catches pivoted on the said friction members and adapted to be engaged with the teeth on the driving member, a pedal shaft actuating said sleeve, a second sleeve acting on the bolts or catches, a second pedal shaft for displacing the said second sleeve, a connection between the two pedal shafts whereby the second shaft is rotated angularly when the first pedal shaft is acted upon to stop the action of the clutch and a spring actuated pawl coöperating with the second pedal shaft to prevent undue movement of the bolts actuating sleeve, substantially as described and for the purpose set forth.

In testimony whereof I have signed my name to this specification in the presence of two subscribing witnesses.

ERNST LEHMANN.

Witnesses:
  GREGORY PHELAN,
  GEORGE BEDE.